J. M. FLITCRAFT.
JAR FOUNTAIN WATERER.
APPLICATION FILED JAN. 31, 1921.
1,397,627.
Patented Nov. 22, 1921.
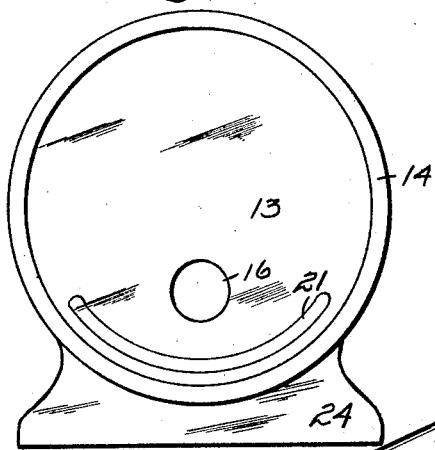
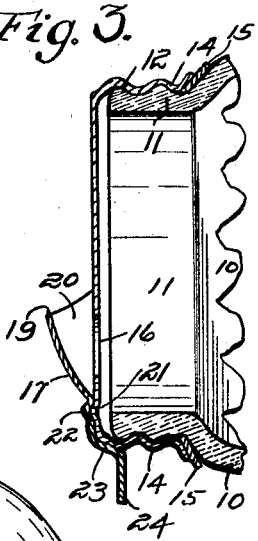
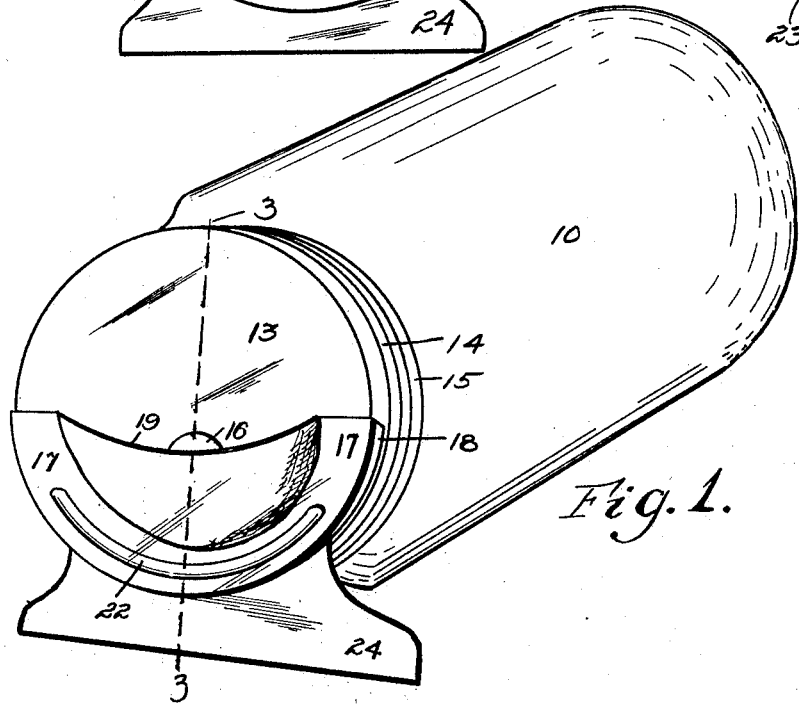
Witness
D. L. Cope.
Inventor
J. M. Flitcraft
By Bair & Freeman
Attys.

UNITED STATES PATENT OFFICE.

JOHN M. FLITCRAFT, OF ELKHART, IOWA.

JAR-FOUNTAIN WATERER.

1,397,627. Specification of Letters Patent. Patented Nov. 22, 1921.

Application filed January 31, 1921. Serial No. 441,308.

*To all whom it may concern:*

Be it known that I, JOHN M. FLITCRAFT, a citizen of the United States, and a resident of Elkhart, in the county of Polk and State of Iowa, have invented a certain new and useful Jar-Fountain Waterer, of which the following is a specification.

The object of my invention is to provide a jar fountain waterer of simple, durable and inexpensive construction.

With these and other objects in view my invention consists in the construction, arrangement and combination of the various parts of my device, whereby the objects contemplated are attained, as hereinafter more fully set forth, pointed out in my claim, and illustrated in the accompanying drawings, in which:

Figure 1 is a perspective view of my device complete.

Fig. 2 is a view of the inside of the cover and supporting member; and

Fig. 3 is a vertical central, sectional view taken on the line 3—3 of Fig. 1.

In the accompanying drawings I have used the reference numeral 10 to indicate an ordinary jar, preferably of glass, and of the Mason type.

The jar 10 is provided with a reduced neck 11 having the screw threaded portion 12 thereon. A cover device 13 having an annular screw threaded flange 14 therein is adapted to coact with the screw threaded portion 12 of the jar 10.

A rubber band 15 is used for preventing any of the contents from the jar 10 from leaking; the band 15 serving as a sealing means.

The cover 13 is provided with an opening 16 which is off-center, the purpose of which will be hereafter more fully set forth.

A trough member 17 has one of its edges as 18, fixed to the cover 13 while the edge 19 is spaced away from the cover 13 so as to form the trough 20.

The cover 13 is provided with a rib 21, which coacts with a rib 22 which is formed in the trough member 17.

The trough member 17 is secured to the cover 13 by either spot welding, or other fastening means. The coacting ribs 21 and 22 tend to prevent any leaking between the trough member 17, and the cover member 13.

The lower edge of the trough member 17 is bent rearwardly as at 23 and then downwardly as at 24 for forming a support. The lower edge of the support 24 is horizontal and adapted to rest upon the ground or some other flat surface.

When the cover is installed on the jar 10, the jar may be laid upon its side, the support 24 preventing any rolling movement of the jar 10. This causes the trough 20 to always remain in proper position when the jar is laid upon its side.

In the practical operation of my device the cover 13 is removed from the jar, and the jar is filled with water.

The rubber band 15 is placed around the neck of the jar and then the cover is secured on to the screw threaded portion 12.

The placing of the cover 13 over the neck or the jar and the using of the rubber band 15 prevents any air from passing into the jar between the screw threads 14 of the cover, and the screw threaded portion 12 of the jar.

When the jar is moved to the position shown in Fig. 1 of the drawings, then the water will pass through the opening 16 and partially fill the trough 20.

As soon as the water in the trough reaches the point where it is parallel with the uppermost edge of the opening 16, a water seal will be formed for preventing any air from passing into the jar.

As the water is consumed from the trough 20, then the reserve supply of water in the jar 10 will be permitted to pass into the trough 20.

The lower edge of the opening 16 is above the lower edge of the trough 20 so that any dirt or other foreign matter which may be received in the trough will not pass into the reserve supply of water in the jar 10.

Some changes may be made in the construction and arrangement of the parts of my machine without departing from the real spirit and purpose of my invention, and it is my intention to cover by my claim, any modified forms of structure or use of mechanical equivalents, which may be reasonably included within its scope.

I claim as my invention:

The combination of a cylindrical jar, having a reduced screw threaded neck, a cover adapted to coöperate with said jar whereby the jar and cover may be used as a drinking fountain, said cover having a screw threaded anuular flange to coöperate with said neck and having a hole and a single piece of material for forming a combined trough and supporting member, said piece of material being bent so as to provide a portion spaced away from the cover and a portion adapted to rest against the cover for forming the trough and said material being also bent so as to provide a portion for engaging a part of the flange of the cover and thence bent downwardly for forming the support.

Des Moines, Iowa, January 12, 1921.

JOHN M. FLITCRAFT.